(12) United States Patent
Chernoff

(10) Patent No.: US 7,513,007 B2
(45) Date of Patent: Apr. 7, 2009

(54) VEHICLE STORAGE CONSOLE

(75) Inventor: Adrian B. Chernoff, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 727 days.

(21) Appl. No.: 11/064,425

(22) Filed: Feb. 23, 2005

(65) Prior Publication Data

US 2006/0085940 A1 Apr. 27, 2006

Related U.S. Application Data

(60) Provisional application No. 60/622,417, filed on Oct. 26, 2004.

(51) Int. Cl.
*A47L 5/38* (2006.01)
*B60S 1/64* (2006.01)

(52) U.S. Cl. .......................... 15/313; 15/314; 15/323; 15/339; 62/244; 62/331; 296/24.34; 296/24.35; 296/24.46

(58) Field of Classification Search .................. 15/301, 15/313, 314, 315, 327.2, 328, 330, 323, 327.5, 15/344; 62/244, 434, 440, 331, 433, 457.4, 62/457.5, 457.8, 3.1–3.7; 296/37.1, 37.8, 296/24.34, 24.35, 24.41, 24.46; *A47L 5/38, A47L 9/18; B60S 1/64*
See application file for complete search history.

(56) References Cited

U.S. PATENT DOCUMENTS

| 2002/0175531 | A1* | 11/2002 | Worrell et al. | ........... 296/37.15 |
| 2004/0107528 | A1* | 6/2004 | LeClear et al. | ................. 15/313 |
| 2004/0134013 | A1* | 7/2004 | Slone | .......................... 15/313 |
| 2006/0080801 | A1* | 4/2006 | Nameth | ....................... 15/313 |

* cited by examiner

*Primary Examiner*—David A Redding

(57) ABSTRACT

A storage console for a vehicle includes a vacuum cleaner. In an exemplary embodiment, the console includes an interface at which the vacuum cleaner is releasably affixed to the console. The console may include a hose operatively connected to the vacuum cleaner whereby suction from the vacuum cleaner is transferred through the hose. The interface may include electrical contacts for recharging a battery in the vacuum cleaner.

13 Claims, 2 Drawing Sheets

VEHICLE STORAGE CONSOLE

CROSS-REFERENCE TO RELATED APPLICATIONS

This application claims the benefit of U.S. Provisional Application 60/622,417, filed Oct. 26, 2004, and which is hereby incorporated by reference in its entirety.

TECHNICAL FIELD

The present invention relates to storage consoles in a vehicle passenger compartment.

BACKGROUND OF THE INVENTION

Prior art vehicles typically include storage compartments accessible from a passenger compartment. For example, many vehicles include a glove compartment or glove box that is situated in a dash board or instrument panel forward of a passenger seat. Exemplary glove boxes are described in U.S. Pat. No. 4,596,416, issued Jun. 24, 1986 to Muller, and U.S. Pat. No. 5,890,755, issued Apr. 6, 1999 to Speelman et al.

Vehicle cleaning is typically performed using an off-board apparatus such as a household vacuum cleaner outside a vehicle user's home or business, or a vacuum cleaner provided at a specialized carwash facility.

SUMMARY OF THE INVENTION

A storage console is provided for use in a vehicle interior, preferably between two front row seats or two rear seats. The storage console defines a plurality of chambers or compartments that may be used for storage.

In an exemplary embodiment, a chamber contains a vacuum apparatus for vehicle clean-up. An interface in the chamber has at least one fastening element, and the vacuum apparatus includes at least one complementary fastening element releasably matable with the fastening element of the interface to releasably fasten the vacuum apparatus to the console.

Preferably, a second chamber is thermally insulated to provide hot/cold storage. The storage console preferably includes a heating and/or cooling system operative to heat or cool the second chamber. A lid that provides selective access to the second chamber preferably defines a beverage holder in thermal communication with the heating and/or cooling system. In another embodiment, the beverage holder has its own heating and/or cooling system that is independent from the heating and cooling system of the second chamber.

A third chamber is preferably provided for refuse storage, and is preferably sufficiently sized so that it can be lined with a plastic bag.

Preferably, a fourth chamber contains removable storage bins that may store office items, audio/visual media, etc.

The storage console also preferably includes electronic ports, such as power ports for powering external devices, and audio ports for headsets connected to an audio system such as an MP3 player, VHS player, DVD player or radio.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2b is a schematic top view of the console interface for the vacuum apparatus of FIG. 2a.

DESCRIPTION OF THE PREFERRED EMBODIMENTS

Figure 1:
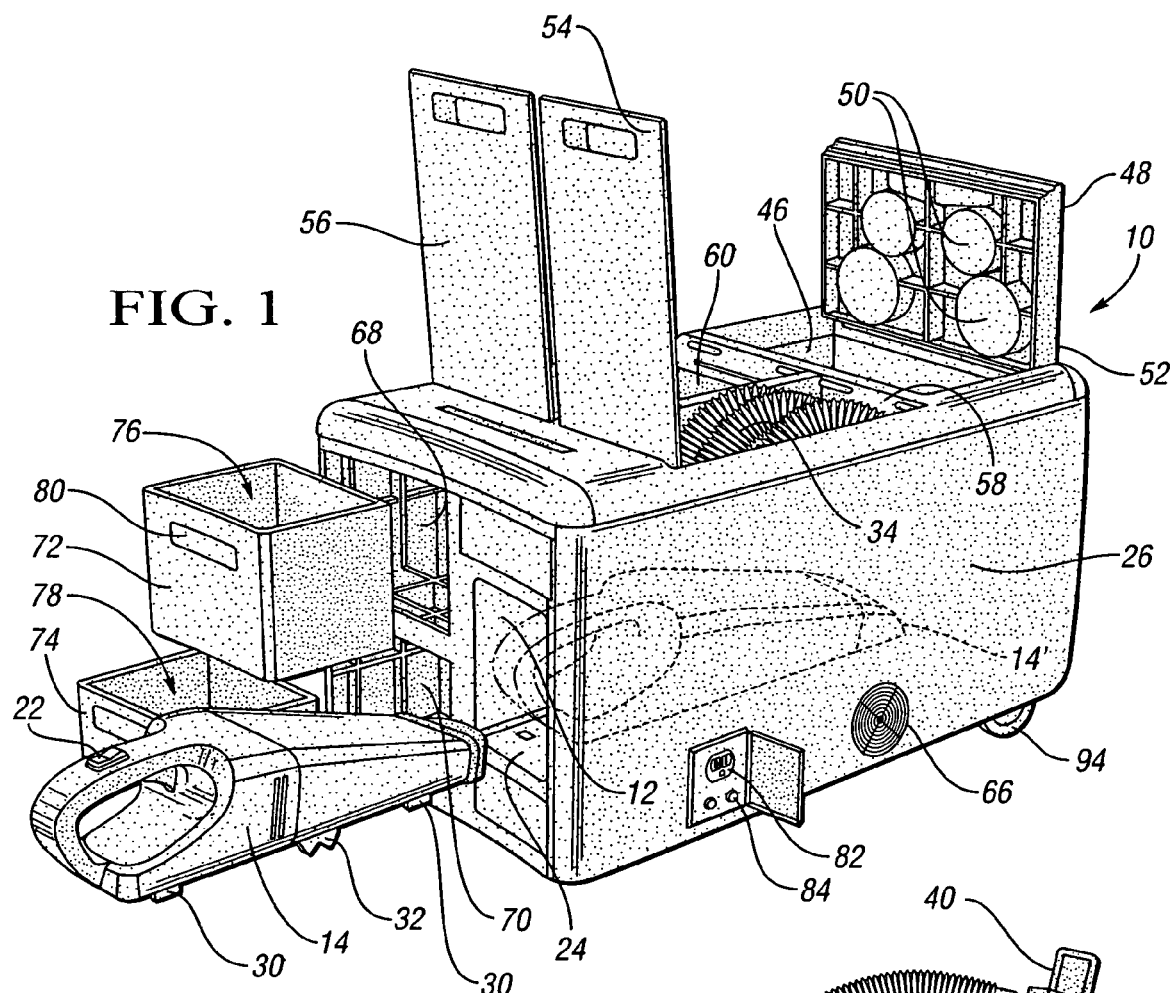
FIG. 1 is a schematic rear perspective view of an integrated storage console including an interface at which a vacuum apparatus is attachable and engagable with a hose.

Referring to FIG. 1, an integrated storage console 10, which may also be referred to as a "utility island," for installation in a vehicle is schematically depicted. The console 10 defines a first chamber 12 that is open on the rearward face of the console 10. The first chamber 12 houses a vacuuming apparatus. In the preferred embodiment, the vacuuming apparatus consists of a hand holdable vacuum, which is stowable in the first chamber 12, as shown in phantom at 14' in FIG. 1. The vacuum is selectively removable from the first chamber 12, as shown at 14 in FIG. 1, for use throughout the vehicle. In a preferred embodiment, the vacuum 14 is capable of picking up wet and dry spills and has a High Efficiency Particulate Air (H.E.P.A.) filter (not shown) capable of removing 99.97% of airborne particles. Additionally, the vacuum 14 has a dirt-finding headlight (not shown), low battery and charge indicator lights (not shown), and a 9-ounce containment bowl 16 for containing vacuumed debris, e.g., crumbs, dust particles, etc. The bowl 16 preferably contains a sensor 18 configured to monitor the level of vacuumed debris in the containment bowl 16 or in the vacuum filter and indicate when the bowl 16 or filter has reached capacity. An audial indication, such as a beeping sound, or a visual indication, such as a light, may be made when the sensor determines that the vacuum 14 is full.

Figure 2A:
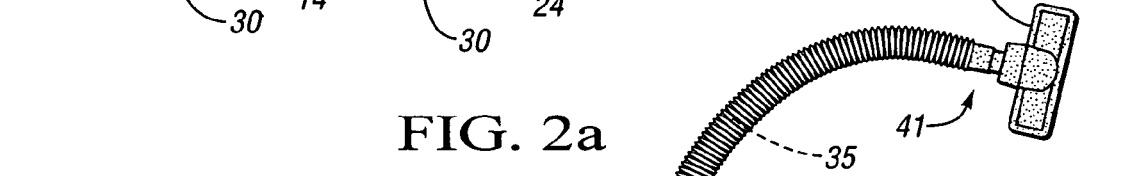
FIG. 2a is a schematic perspective view of the interface, vacuum apparatus, and hose of FIG. 1.

Referring to FIG. 2a, the vacuum 14 includes a rechargeable energy source 20 (or battery), which can be charged when the vehicle is in operation. Even when the vehicle is off, the hand-held vacuum 14 is operable as it has its own on/off switch 22. Alternatively, within the scope of the claimed invention, the hand-held vacuum 14 may use the vehicle's power to operate. The battery 20 on the hand held vacuum 14 may be wired to other portions of the console to supply electric power to other devices.

Figure 2B:
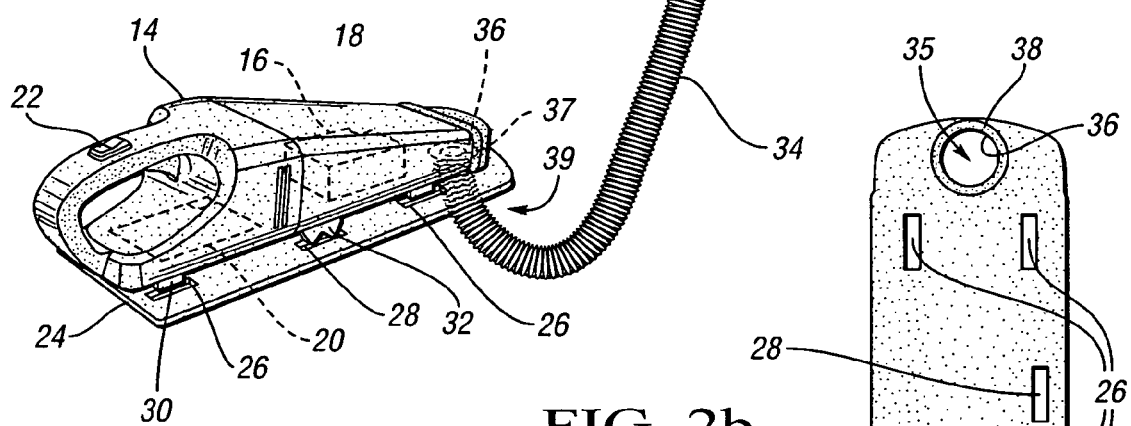

Referring again to FIG. 1, the hand-held vacuum 14 in the embodiment depicted is releasably connectable to an interface 24, located in the storage console 10 and forming the lower surface of the first chamber 12. Referring to FIGS. 2a and 2b, the interface 24 includes fastening elements 26 for releasably retaining the vacuum 14 in the console 10, as well as electrical contacts 28 in electrical communication with the vehicle's electrical system for maintaining the charge of the vacuum's battery 20. Likewise, the vacuum 14 contains complementary fastening elements 30 that are selectively releasably engaged with the fastening elements 26 on the interface 24 to retain the vacuum 14 in the console. Exemplary fastening elements include latches, tabs, etc. The vacuum 14 also includes complementary electrical contacts 32 that mate with contacts 28 on the interface 24 to provide electrical communication between the battery 20 and the vehicle's electrical system when fastening elements 26 are engaged with respective complementary fastening elements 30.

Moreover, the console 10 includes a hose 34 at least partially defining a passageway 35 having a passageway opening 36. The vacuum apparatus defines a suction opening 37. The fastening elements 26 of the interface 24 and the complementary fastening elements 30 of the vacuum apparatus 14 are sufficiently positioned such that, when the complementary fastening elements 30 of the vacuum apparatus 14 are mated with the fastening elements 26 of the interface 24, the suction opening 37 aligns with the passageway opening 36. A rubber seal 38 preferable surrounds passageway opening 36 to contact the surface of vacuum 14 surrounding the suction opening 37, thereby to improve suction through the hose 34.

The hose 34 includes a first end 39 sealingly attached to the console 10 and in fluid communication with opening 36. Thus, suction from the vacuum 14 is provided to a second end 41 of the hose. The second end 41 of the hose is selectively movable within the passenger compartment of the vehicle. The hose 34 optionally includes various detachable nozzles (such as nozzle 40) for cleaning various surfaces. The hose 34 is preferably approximately five feet in length to reach the first and second rows of seats (42 and 44 in FIG. 3) when the console 10 is situated between the first row of seats 44. Alternatively and within the scope of the claimed invention, the vacuum 14 may be permanently affixed to the console 10, and include a flexible suction hose 34 of sufficient length to reach the front and rear seats of the vehicle (42 and 44 respectively).

Referring again to FIG. 1, the console 10 includes a second chamber 46. In the preferred embodiment, the second chamber 46 is thermally insulated to preserve the temperature of items stored in the second chamber 46. Hot meals can be stored in the second chamber 46 to stay warm for extended periods of time. Likewise, cold beverages can be held in the second chamber 46 and stay chilled during longer road trips. Alternatively, and within the scope of the claimed invention, the second chamber 46 keeps items hot or cold with or without using thermal insulation.

The second chamber includes a lid 48 that forms generally cylindrical concavities 50 (as shown protruding from the bottom of the lid 48 in FIG. 1) for cup holders. The lid 48 is capable of transferring thermal energy to or from cups or other containers inside the cup holders to heat or cool the cup contents. The preferred embodiment employs a thermoelectric heating and cooling device at 47 (shown in FIG. 3) in thermal communication with the lid 48 and cup holders 50. The heating and cooling device is preferably governed by the principles of the Peltier Effect. Though in the preferred embodiment the heating and cooling device is electrically powered—employing the principles of thermal electricity—those skilled in the art will recognize that heating and cooling the cup contents can be accomplished in a number of ways within the scope of the claimed invention. Alternatively, the lid 48 can be insulated to preserve the temperature of the beverage holder's contents. In addition to acting as a cup holder, the lid 48 may be selectively removable from the console 10 to function as a tray for food preparation or for passing items such as sandwiches or pizza to other passengers.

Figure 3:
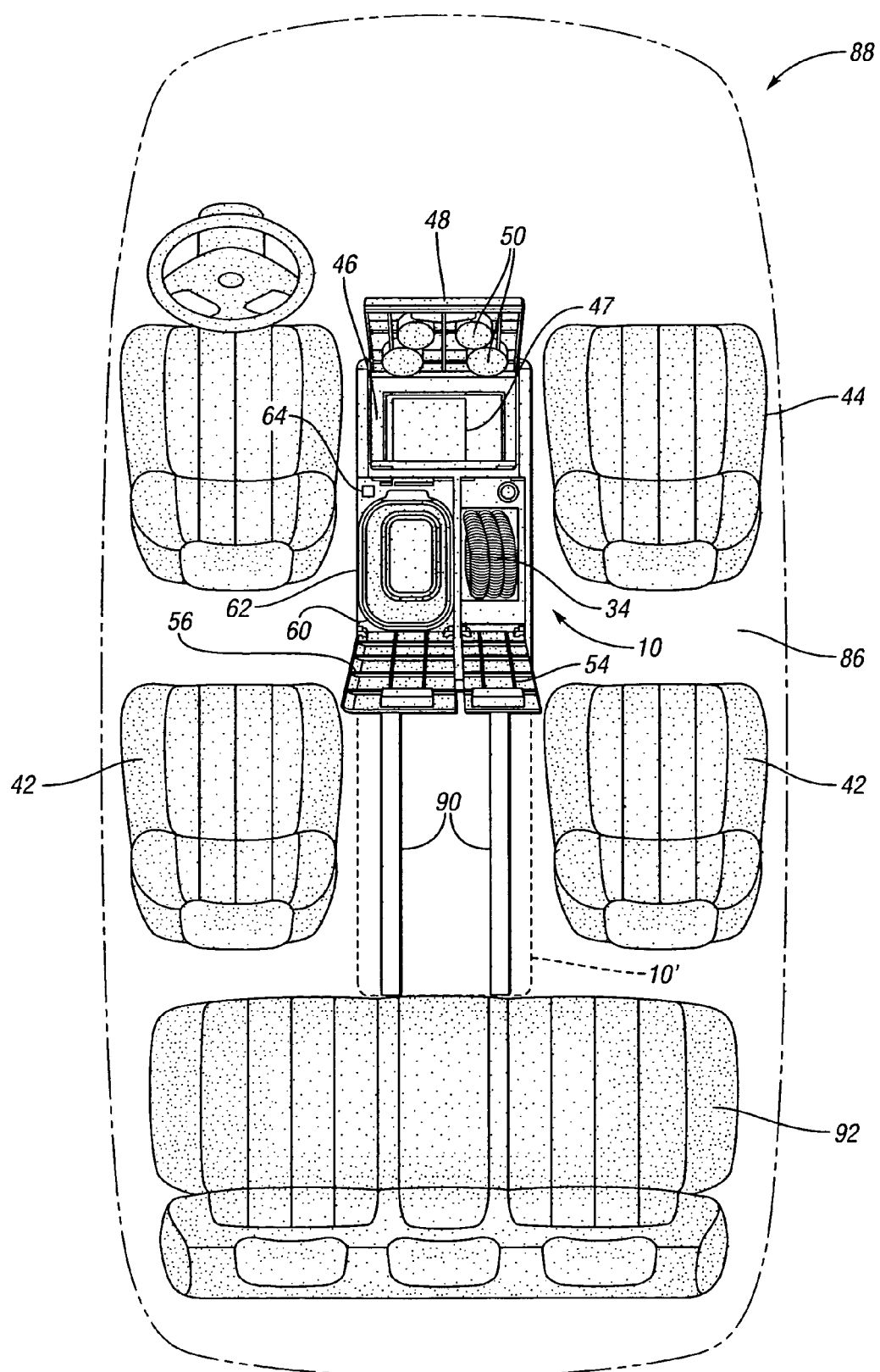
FIG. 3 is a schematic top view of the integrated storage console installed on a vehicle floor.

Alternatively, and within the scope of the claimed invention, separate and independent heating and cooling devices may be in thermal communication with the lid 48 and second chamber 46, respectively, so that the beverage holders 50 and the chamber 46 can have different temperatures. With this arrangement the user could have cold drinks in the lid 48 of the console 10 while keeping a meal hot in the second chamber 46 of the console 10, or vice versa. The second chamber can store up to 20 liters and has a cooling capacity of 20° F. and a heating capacity of 149° F., powered by 48 watts. The electrical wiring for the heating and cooling device is configured to be compatible with a 12-volt DC or 120-volt AC power supply. The console 10 is also configured to supply power to the heating and cooling device 47 from the rechargeable energy source 20, thereby allowing cool or warm items in the second chamber 46 to sustain their temperature for short periods of time even when the vehicle is not running. The lid 48 is selectively moveable between open and closed positions. When the lid 48 is open as shown in FIGS. 1 and 3, the second chamber 46 is accessible. When closed, the lid 48 forms a portion of the upper surface of the console 10. The lid 48 is pivotably connected at its forward end 52, such as by hinges, to the console 10. In an alternative embodiment, the lid 48 defines a rectangular recess or cavity sufficiently sized to contain a 9 inch by 13 inch food transport container, such as a pan, for transporting food. The walls of the recessed cavity retain the container during vehicle braking, acceleration, and turning, thereby enabling facilitated transport of prepared food.

The second chamber's functionality is not limited to being a thermal storage unit. This section can also double as a concealed storage unit that fits handbags, laptops, and other items. The lid 48 may be equipped with a locking feature to better secure such items as handbags and laptops in the second compartment when the lid 48 is in the closed position.

The console 10 also includes lids 54 and 56 that further define the upper surface of the console 10 when closed. Referring to FIG. 1, the console 10 defines a third chamber 58 and a fourth chamber 60 that are accessible through the top of the console 10 when the lids 54, 56 are open. Lid 54, when closed, covers and conceals chamber 58. Lid 56, when closed, covers and conceals chamber 60. The hose 34 is shown at least partially contained inside the third chamber 58 for storage when not in use.

The fourth chamber 60 provides a convenient location for refuse disposal. In the preferred embodiment, a removable 12-liter plastic bin (as shown at 62 in FIG. 3) is provided in the third chamber 60. The bin 62 is preferably sufficiently sized to contain up to 12 liters, and can be lined with a small plastic bag or trashcan liner. The bin 62 is also dishwasher safe for easy cleaning. The fourth compartment 60 is conveniently located at the rear of the console 10 for easy access from the front row and rear row seats (42 and 44, respectively) when the console is between the two rows of seats.

In the preferred embodiment, a gas sensor 64, as schematically shown in FIG. 3, is included in the fourth compartment 60 to detect odors and activate an alarm to inform users when it is time to remove and empty the refuse in the bin 62. The gas sensor 64 monitors the composition of the air in the chamber 60. To detect odors the gas sensor can be configured to detect a predetermined level of carbon dioxide or methane ($CH_4$)—byproducts of organic decay.

The fourth compartment 60 may also be utilized for other functions, such as storage for office equipment. The compartment 60 may have section dividers (not shown) for paper, folders, magazines, and potentially computer peripherals.

In another embodiment, the integrated storage console 10 contains an air filtration system 66 (of FIG. 1) that can filter the air inside the vehicle. The arrangement is ideal for users with allergies or asthma. Additionally, the filtration system 66 can be configured to remove odors from the air and replace them with an air freshening agent or chemical.

Referring again to FIG. 1, the console 10 defines fifth and sixth chambers 68, 70. The fifth and sixth chambers 68, 70 are open on the rear face of the console 10. The console 10 further includes removable bins or drawers 72, 74 that define storage compartments 76, 78. Each bin 72, 74 is stowable in a respective one of the fifth and sixth chambers 68, 70, as shown in FIG. 1. The bins 72, 74 each include a handle 80 formed therein to facilitate removal from the chambers. The bins 72, 74 may be large enough to store headphones, compact disks, gaming controls, etc. Optionally, one large bin may be used instead of two separate bins 72, 74. The bins 72, 74 may be lockable.

The storage console 10 is outfitted with at least one external audio port 84 and electrical outlet connector 82. Additionally, audio controllers (not shown) for rear seat passenger are available. In one arrangement, the integrated storage console 10 includes an MP3 player, DVD controls, displays, remote controls and other audio/visual media (not shown). A traditional cigarette lighter (not shown) is also provided. The console can be operatively connected to the vehicle electrical system with an included 12-volt adaptor (or other electrical connector) to plug directly into the vehicle or the cigarette lighter, and it may also have a 110 volt plug for home/portable use if the console is removed from the vehicle.

In other arrangements, the various chamber doors or lids (48, 54 and 56) may be configured in a number of ways such as those having Bombay doors and sliders. In a preferred embodiment, the doors (or lids) include coin tray inserts (not shown) or coin sorters.

Referring to FIG. 3, the integrated storage console 10 is securable to a floor 86 of a vehicle 88 that partially defines a passenger space. The storage console 10 is attached to the interior floor 86 by a track system 90, such as that described for use with vehicle seats in U.S. Pat. No. 5,482,243, entitled Seat Adjuster Slide Arrangement issued Jan. 9, 1996 to Minder, and hereby incorporated by reference in its entirety. The console 10 is selectively translatable fore and aft within the vehicle 88 along the track 90 between a forward position wherein the console 10 is between two front seats 44, and a rearward position, shown in phantom at 10', wherein the console 10' is between two rear seats 42. In the embodiment depicted, the vehicle includes a third row of seats 92. The console 10 and vehicle 88 may be configured so that the console 10 may slide between the third row of seats 92 as well. The integrated storage console has a releasable locking or latching device (not shown) that selectively locks the console at certain locations on the track 90.

Alternatively, the console 10 can be stored in various locations throughout the vehicle 88 such as underneath the instrument panel or in the rear of the vehicle 88 behind the third row seating 92. The console may also be permanently installed at a fixed location within the vehicle 88.

Moreover, the preferred embodiment allows for the integrated storage console 10 to be detached from the vehicle floor 86 and track system 90 for use outside of the vehicle. For instance, the integrated storage console will have wheels 92 (as shown in FIG. 1) located on its exterior so that it can be rolled to a desired location. The integrated storage console can also have handles (not shown) to assist the user in rolling or to allow the user to carry the integrated storage console. This use would be ideal for picnics, camping and other outdoor excursions. The console is not limited to being affixed to certain locations within the vehicle cab but may be detached from the vehicle flooring and sit in the vehicle cargo area or on top of the passenger seats.

Alternatively, and within the scope of the claimed invention, the base of the integrated storage console can be outfitted with clamps that attach to a set of brackets in the vehicle floor. Multiple sets of brackets can be located in several places throughout the vehicle interior, and the integrated storage console can be mounted at the specified locations when so desired.

Within the scope of the claimed invention, the integrated storage console can also be smaller than the arrangement shown in the preferred embodiments to include fewer chambers and fewer functional devices. A smaller version of the integrated storage console may be more compatible with smaller vehicles having less interior space.

A method of marketing and selling an integrated storage console is provided. The method includes maintaining an inventory of differently configured or appointed consoles that have variable themes suitable for different types of customers; advertising a thematic configuration of the console to customers for sale; offering to grant possession of any of the consoles in the inventory; and granting possession to a customer of a console selected by the customer.

The chambers can be arranged and coordinated with marketing themes to target sales to specific types of buyers (or users). Each arrangement may have a nickname designed to highlight the theme of that specific arrangement. One arrangement is the Fiji which is perfect for a picnic. The chambers of the Fiji function to support the concept of being able to have an island getaway in your vehicle. The Fiji's features include: hot/cold storage, utensils, glasses, plates, napkins, a cutting board, blanket, and other dining items. The Fiji may also include a trash area, but it is not necessary. Contrastingly, the Manhattan functions as the perfect mobile office. The Manhattan comes equipped with a power port to recharge a cellular phone, a hands free attachment, laptop, a laptop storage area, foldout trays to write on, storage for pencils and pens, and a printer. Other marketable themes include: the Santorini for the culinary arts specialist; the Maui for buyers most interested in entertainment and play; the Treasure Island for storage of children's' toys and/or games; the Ellis having an electronic portal for Wi-Fi connection and satellite; and the Catalina with a tool shed, perfect for the modern handyperson. In either arrangement the console components (such as 62, 72 and 74) may have different functionality. For example, a Treasure Island console may be arranged so that the bin 62 is configured to hold building blocks instead of refuse.

The console may also include a user-configurable system with racks, shelves, and dividers that may be employed within chambers of the console to customize the chambers for specific needs.

While the best modes for carrying out the invention have been described in detail, those familiar with the art to which this invention relates will recognize various alternative designs and embodiments for practicing the invention within the scope of the appended claims.

The invention claimed is:

1. A vehicle, comprising:
   a vehicle floor at least partially defining a passenger space;
   a console mounted with respect to said vehicle floor and located within said passenger space, said console defining a plurality of chambers;
   a vacuum apparatus at least partially positioned in one of said chambers and configured to selectively generate suction; and
   a lid being selectively moveable to cover one of said chambers; wherein said lid defines generally cylindrical concavities;

wherein said console has a heating and cooling system in thermal communication with said generally cylindrical concavities of said lid.

2. The vehicle of claim 1, wherein said console includes an interface having at least one fastening element, and wherein said vacuum apparatus includes at least one complementary fastening element releasably engagable with said at least one fastening element of said interface to releasably fasten the vacuum apparatus to the console.

3. The vehicle of claim 2, wherein said console includes a hose at least partially defining a passageway having a passageway opening; wherein said vacuum apparatus defines a suction opening; and wherein said at least one fastening element of said interface and said at least one complementary fastening element of said vacuum apparatus are sufficiently positioned such that when said at least one complementary fastening element of said vacuum apparatus is engaged with said at least one fastening element of said interface, said suction opening aligns with said passageway opening.

4. The vehicle of claim 2, wherein said interface includes at least one electrical contact and wherein said vacuum apparatus includes a complementary electrical contact matable with said at least one electrical contact on the interface.

5. The vehicle of claim 4, wherein said vacuum apparatus includes a rechargeable energy storage device in electrical communication with said at least one complementary electrical contact.

6. The vehicle of claim 2, wherein said vacuum apparatus includes a capacity sensor configured to indicate when said vacuuming apparatus is filled to a predetermined level.

7. The vehicle of claim 1, further comprising:
a track connected to said vehicle floor; wherein said console is operatively connected to said track for selective translation.

8. The vehicle of claim 1, wherein said lid is selectively removable from said console.

9. The vehicle of claim 1, further comprising:
a gas sensor; wherein said gas sensor is configured to indicate the presence of a predetermined level of a gas in one of said chambers.

10. The vehicle of claim 1, wherein one of said chambers includes a bin; wherein said bin is configured to provide auxiliary storage space and is selectively removable from said one of said chambers.

11. The vehicle of claim 1, wherein said console further comprises at least one wheel by which said console can roll.

12. The vehicle of claim 1, wherein said console further comprises:
an air filtration mechanism.

13. The vehicle of claim 1, wherein said console further comprises:
one of an external electrical outlet and an external audio port.

* * * * *